(12) United States Patent
Ren

(10) Patent No.: US 10,095,374 B2
(45) Date of Patent: Oct. 9, 2018

(54) METHOD AND DEVICE FOR CLICKING AND SELECTING OBJECT IN THREE-DIMENSIONAL VIRTUAL REALITY SCENE

(76) Inventor: Weifeng Ren, Beijing (CN)

( * ) Notice: Subject to any disclaimer, the term of this patent is extended or adjusted under 35 U.S.C. 154(b) by 623 days.

(21) Appl. No.: 14/403,672

(22) PCT Filed: Sep. 12, 2012

(86) PCT No.: PCT/CN2012/001257
§ 371 (c)(1),
(2), (4) Date: Nov. 25, 2014

(87) PCT Pub. No.: WO2013/173947
PCT Pub. Date: Nov. 28, 2013

(65) Prior Publication Data
US 2015/0135128 A1    May 14, 2015

(30) Foreign Application Priority Data
May 25, 2012  (CN) .......................... 2012 1 0167550

(51) Int. Cl.
*G06F 3/048* (2013.01)
*G06F 3/0481* (2013.01)
(Continued)

(52) U.S. Cl.
CPC ...... *G06F 3/04815* (2013.01); *G06F 3/04842* (2013.01); *G06T 19/006* (2013.01)

(58) Field of Classification Search
CPC ............. G06F 3/04842; G06F 3/04815; G06T 19/006; G06T 15/005; G08G 1/123
See application file for complete search history.

(56) References Cited

U.S. PATENT DOCUMENTS 6,334,125 B1   12/2001   Johnson
6,462,762 B1   10/2002   Ku et al.
(Continued)

FOREIGN PATENT DOCUMENTS

CN       1710607 A    12/2005
CN     101082934 A    12/2007
(Continued)

OTHER PUBLICATIONS

"Docs for Class Node", [online], [retrieved May 14, 2016], http://harmoni.sourceforge.net/doc/org/osid.hierarchy/Node.html, 2007.*
(Continued)

*Primary Examiner* — Rashawn N Tillery
(74) *Attorney, Agent, or Firm* — Cantor Colburn LLP (57) ABSTRACT

A method for clicking and selecting an object in a three-dimensional virtual reality scene is provided. The method includes: receiving a positioning signal of a target object in a three-dimensional virtual reality scene; projecting the target object to a set position in a display window according to the positioning signal; if the target object is displayed at the set position, after a behavior for clicking the target object is perceived, acquiring two-dimensional coordinates corresponding to a clicking position in the display window; determining a single object corresponding to the clicking position according to the two-dimensional coordinates; acquiring a leaf node corresponding to the single object in a tree management structure, and acquiring a father node of the leaf node; if the attribute of the father node is unlock, selecting the single object; if the attribute of the father node is lock, tracing a node from the father node along the direction towards the root node of the tree management structure, wherein the node is closest to the father node and the attribute of the node as a father node is unlock, and selecting a combined object corresponding to the node. Also, (Continued)

a device for clicking and selecting an object in a three-dimensional virtual reality scene is provided.

14 Claims, 5 Drawing Sheets

(51) Int. Cl.
  *G06F 3/0484* (2013.01)
  *G06T 19/00* (2011.01)

(56) References Cited

U.S. PATENT DOCUMENTS

| | | |
|---|---|---|
| 6,772,174 B1 | 8/2004 | Pettersson |
| 2002/0024517 A1 | 2/2002 | Yamaguchi et al. |
| 2003/0225781 A1 | 12/2003 | Kusterer |
| 2004/0076331 A1 | 4/2004 | Gioia |
| 2005/0035883 A1* | 2/2005 | Kameda ............ G01C 21/3638 340/995.1 |
| 2011/0047509 A1 | 2/2011 | Arrasvuori |
| 2015/0138211 A1* | 5/2015 | Ren ........................ G06F 7/06 345/520 |
| 2015/0178976 A1 | 6/2015 | Strauss |
| 2015/0221137 A1* | 8/2015 | Oki ................... G06F 3/04815 345/156 |

FOREIGN PATENT DOCUMENTS

| | | |
|---|---|---|
| CN | 101149842 A | 3/2008 |
| CN | 101271585 A | 9/2008 |
| CN | 101661628 A | 3/2010 |
| CN | 102289839 A | 12/2011 |
| EP | 2091022 A1 | 8/2009 |

OTHER PUBLICATIONS

Jian Wang, "The Selection Method of the Graphics at 3D Graphic Browser", Jul. 31, 2004, p. 29.
International Search Report for corresponding application PCT/CN2012/0001259 filed Sep. 12, 2012; dated Feb. 28, 2013.
International Search Report for corresponding application PCT/CN2012/001257 filed Sep. 12, 2012; dated Mar. 7, 2013.
Docs for Class Node, [online], retrieved May 14, 2016; http://harmoni.sourceforge.net/doc/org/osid.hierarchy/Node.html, 2007.

* cited by examiner

METHOD AND DEVICE FOR CLICKING AND SELECTING OBJECT IN THREE-DIMENSIONAL VIRTUAL REALITY SCENE

TECHNICAL FIELD

The invention relates to the technical field of three-dimensional virtual reality, in particular to a method and a device for clicking and selecting an object in a three-dimensional virtual reality scene.

BACKGROUND

The rapid development of computer image technology promotes the progress of a three-dimensional virtual reality technology. The construction basis of a three-dimensional scene in a three-dimensional virtual reality includes three aspects as follows. Firstly, a picture has a perspective effect which is the basis for viewing a three-dimensional world and is the basic requirement for generating a third dimension on the picture. Secondly, the picture has correct changes of brightness, darkness, virtuality and reality; in real world, an object may have corresponding bright part, dark part, projection, gloss and the like according to difference of the brightness, the colors, the positions and the quantities of light sources; further, the objects nearby are relatively high in aspects such as saturability, brightness and contrast of the color, and the objects far away are relatively low in these aspects. Thirdly, a space positioning effect on both eyes is achieved; when people views the object with eyes, the two eyes respectively observe the object from two angles, so that two observed pictures have tiny differences, and the brain mixes the two pictures into a complete picture and perceives a distance to the observed object according to a picture difference clue, and that is the space positioning of the two eyes.

So, the object in a three-dimensional virtual space is not defined through a plane, but is a three-dimensional object with a thickness and a subordination hierarchy relation, and the scene itself has relations such as the depth and the view angle. However, the equipment based on human-machine interaction still adopts a conventional two-dimensional screen, a conventional mouse and a conventional keyboard, and the cursor of the mouse also slides on a two-dimensional plane (in particular the screen).

Figure 1:
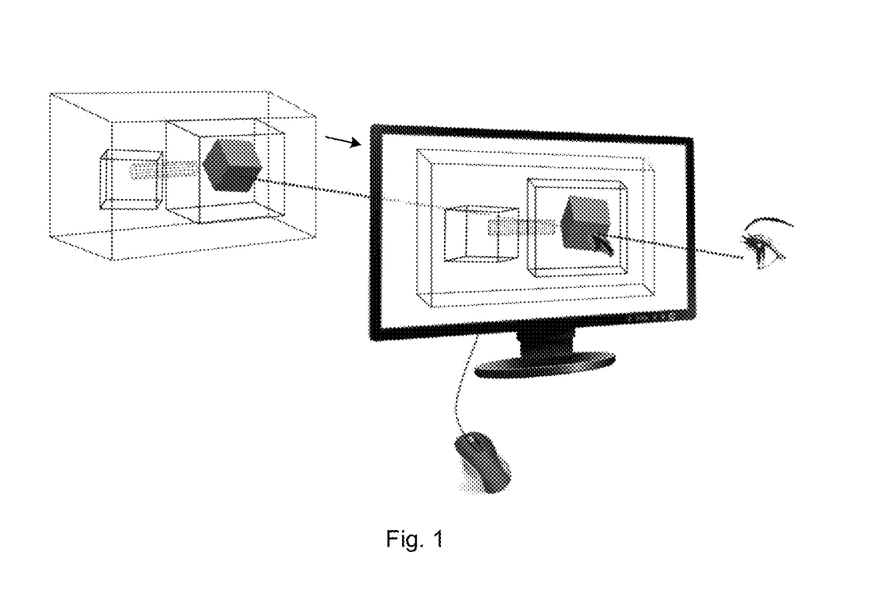
FIG. 1 is a diagram showing the click and selection of an object in a three-dimensional scene implemented in the two-dimensional display.

FIG. 1 is a diagram showing the click and selection of an object in a three-dimensional scene implemented in the two-dimensional display. In the three-dimensional space, two-dimensional coordinates of the mouse in a three-dimensional scene window are acquired and transmitted to a virtual camera corresponding to the three-dimensional scene window, and a ray perpendicular to the three-dimensional scene window is generated in a direction of the position of the camera and extends in the three-dimensional scene, the first object intersected with the ray in the scene can be detected to indicate that the first object may be clicked.

As the ray and the object are intersected at a point, above method for clicking and selecting the object through the ray may not determine a scope for clicking and selecting the object; in the real world for example, a selection behavior and a sememe for determining a selection scope may be defined, but the selection of the whole body of the object or a part of the object or the definition of the scope of the whole scene is difficult to be realized by clicking the object in the three-dimensional virtual reality scene; in addition, the object which is shaded, included or enclosed can not be mapped into the three-dimensional virtual scene window, so that the click and the selection of the included, the enclosed or the shaded object can be not realized.

SUMMARY

In view of this, the embodiments of invention aims at providing a method and a device for clicking and selecting an object in a three-dimensional virtual reality scene, so as to fulfill the aims of realizing click and selection of the object in the three-dimensional virtual reality scene.

To this end, the invention provides a method for clicking and selecting an object in a three-dimensional virtual reality scene, which includes the following steps:

A1: receiving a positioning signal of a target object in a three-dimensional virtual reality scene;

A2: projecting the target object to a set position in a display window according to the positioning signal;

A3: if the target object is displayed at the set position, after a behavior for clicking the target object is perceived, acquiring two-dimensional coordinates corresponding to a clicking position in the display window;

A4: determining a single object corresponding to the clicking position according to the two-dimensional coordinates;

A5: acquiring a leaf node corresponding to the single object in a tree management structure, and acquiring a father node of the leaf node;

A6: if the attribute of the father node is unlock, selecting the single object;

A7: if the attribute of the father node is lock, tracing a node from the father node along a direction towards a root node of the tree management structure, wherein the node is closest to the father node and the attribute of the node as a father node is unlock, and selecting a combined object corresponding to the node in the three-dimensional virtual reality scene.

Alternatively, the method further comprises:

B1: if the target object is not displayed at the set position, judging whether the target object subordinates to a first object displayed at the set position in the three-dimensional virtual reality scene;

B2: if the target object subordinates to the first object, after a behavior for clicking the first object is perceived, acquiring two-dimensional coordinates corresponding to a clicking position in the display window;

B3: executing the Steps A4 to A7 so as to select the first object;

B4: after a command for entering a next hierarchy is received, entering the next hierarchy of a first node corresponding to the first object, and configuring the attribute of the first node to be unlock;

B5: judging whether a target node corresponding to the target object in the tree management structure is on the next hierarchy, if so, executing Step B7, otherwise, executing Step B6;

B6: determining that the target object subordinates to a second object corresponding to a second node on the next hierarchy, setting the second object to be the first object, and executing the Step B2;

B7: determining that the next hierarchy is a hierarchy where the target object is positioned;

B8: if the target object is shaded by a third object on the hierarchy where the target object is positioned, after a behavior for clicking the third object is perceived, acquiring two-dimensional coordinates corresponding to a clicking position in the display window;

B9: executing the Steps A4 to A7 so as to select the third object;

B10: enhancing the transparency of the third object so as to display the target object and prohibit selecting the third object after the target object is displayed;

B11: after a behavior for clicking the target object is perceived, acquiring two-dimensional coordinates corresponding to a clicking position in the display window;

B12: executing the Steps A4 to A7 so as to select the target object.

Alternatively, the method further comprises:

C1: if the target object does not subordinate to the first object, after a behavior for clicking the first object is perceived, acquiring two-dimensional coordinates corresponding to a clicking position in the display window;

C2: executing the Steps A4 to A7 so as to select the first object;

C3: enhancing the transparency of the first object so as to display the target object and prohibit selecting the first object after the target object is displayed;

C4: after a behavior for clicking the target object is perceived, acquiring two-dimensional coordinates corresponding to a clicking position in the display window;

C5: executing the Steps A4 to A7 so as to select the target object.

Alternatively, the method further comprises: if the clicking position does not correspond to a single object, sending a clicking and selecting failure message.

Alternatively, the method further comprises: generating the tree management structure according to subordination and combination modes among all the objects in the three-dimensional virtual reality scene, wherein nodes in the tree management structure consist of leaf nodes and non-leaf nodes; the leaf nodes correspond to single objects in the three-dimensional virtual reality scene, and the non-leaf nodes correspond to combined objects in the three-dimensional virtual reality scene; each of the combined objects consists of a plurality of single objects.

Alternatively, the step of generating the tree management structure according to the subordination and combination modes among all the objects in the three-dimensional virtual reality scene comprises:

mapping a first combined object to a root node of the tree management structure, wherein the root node is on the first hierarchy of the tree management structure, and the first combined object is the whole three-dimensional virtual reality scene;

if the first combined object includes N parts, the object corresponding to each part of the first combined object belongs to the second hierarchy of the tree management structure, and the node corresponding to each part of the first combined object is a child node of the root node, wherein N is greater than or equal to 1 and is an integer;

when the first combined object consists of E second combined objects and F single objects, and if the second combined object include M parts, the object corresponding to each part of each second combined object belongs to the third hierarchy of the tree management structure, and the node corresponding to each part of each second combined object is a child node of the node corresponding to the each second combined object, wherein N=E+F, E is greater than or equal to 1, F is greater than or equal to 0, M is greater than or equal to 1, and E, F and M are integers;

performing steps by the same manner as above until all the single objects are mapped to corresponding hierarchies in the tree management structure.

A device for clicking and selecting an object in a three-dimensional virtual reality scene comprises:

a signal receiving unit, configured to receive a positioning signal of a target object in the three-dimensional virtual reality scene;

an object projecting unit, configured to project the target object to a set position in a display window according to the positioning signal;

a first judging unit, configured to judge whether the target object is displayed at the set position;

a first acquiring unit, configured to, when the first judging unit judges that the target object is displayed at the set position, acquire two-dimensional coordinates corresponding to a clicking position in the display window after a behavior for clicking the target object is perceived;

a selecting unit, configured to select the target object wherein the selecting unit comprises:

a first determining unit, configured to determine a single object corresponding to the clicking position according to the two-dimensional coordinates;

a second acquiring unit, configured to acquire a leaf node corresponding to the single object in a tree management structure, and acquire a father node of the leaf node;

a second judging unit, configured to judge whether the attribute of the father node is unlock;

a single object selecting unit, configured to select the single object when the second judging unit judges that the attribute of the father node is unlock;

a combined object selecting unit, configured to trace a node from the father node along a direction towards the root node of the tree management structure when the second judging unit judges that the attribute of the father node is lock, wherein the node is closest to the father node and the attribute of the node as a father node is unlock, and select a combined object corresponding to the node in the three-dimensional virtual reality scene.

Alternatively, the device further comprises:

a third judging unit, configured to judge whether the target object subordinates to a first object displayed at the set position in the three-dimensional virtual reality scene when the first judging unit judges that the target object is not displayed at the set position;

wherein the first acquiring unit is further configured to, when the third judging unit judges that the target object subordinates to the first object, acquire two-dimensional coordinates corresponding to a clicking position in the display window after a behavior for clicking the first object is perceived;

wherein the selecting unit is further configured to select the first object;

a hierarchy entering unit, configured to, after the selecting unit selects the first object, enter a next hierarchy of a first node corresponding to the first object when a command for entering the next hierarchy is received, and configure the attribute of the first node to be unlock;

a fourth judging unit, configured to judge whether a target node corresponding to the target object in the tree management structure is on the next hierarchy;

a second determining unit, configured to determine that the target object subordinates to a second object corresponding to a second node on the next hierarchy when the fourth judging unit judges that the target node corresponding to the target object in the tree management structure is not on the next hierarchy, and set the second object to be the first object;

a third determining unit, configured to determine that the next hierarchy is a hierarchy where the target object is positioned when the fourth judging unit judges that the target node corresponding to the target object in the tree management structure is on the next hierarchy;

wherein the first acquiring unit is further configured to, when the target object is shaded by a third object on the hierarchy where the target object is positioned, acquire two-dimensional coordinates corresponding to a clicking position in the display window after a behavior for clicking the third object is perceived;

wherein the selecting unit is further configured to select the third object;

an object displaying unit, configured to enhance the transparency of the third object after the selecting unit selects the third object so as to display the target object and prohibit selecting the third object after the target object is displayed;

wherein the first acquiring unit is further configured to acquire two-dimensional coordinates corresponding to a clicking position in the display window after a behavior for clicking the target behavior is perceived;

wherein the selecting unit is further configured to select the target object.

Alternatively, the first acquiring unit is further configured to, when the target object does not subordinate to the first object, acquire two-dimensional coordinates corresponding to a clicking position in the display window after a behavior for clicking the first object is perceived;

the selecting unit is further configured to select the first object;

the object displaying unit is further configured to enhance the transparency of the first object so as to display the target object and prohibit selecting the first object after the target object is displayed;

the first acquiring unit is further configured to acquire two-dimensional coordinates corresponding to a clicking position in the display window after a behavior for clicking the target object is perceived;

the selecting unit is further configured to select the target object.

Alternatively, the device further comprises:

a tree management structure generating unit, configured to generate the tree management structure according to subordination and combination modes among all the objects in the three-dimensional virtual reality scene, wherein nodes in the tree management structure consist of leaf nodes and non-leaf nodes; the leaf nodes correspond to the single objects in the three-dimensional virtual reality scene, and the non-leaf nodes correspond to combined objects in the three-dimensional virtual reality scene; each of the combined objects consist of a plurality of single objects.

By adopting the pre-generated tree management structure of the three-dimensional virtual reality scene, the method and the device for clicking and selecting the object in the three-dimensional virtual reality scene not only realize the selection of a single object (or a single element) and the combined object (or combined element) in the three-dimensional virtual reality scene, but also display the target object by enhancing the transparency of the shaded object in the three-dimensional virtual reality scene and performing non-selection setting, so as to finally realize the click and the selection of the shaded target object.

BRIEF DESCRIPTION OF THE DRAWINGS

In order to more clearly illustrate the embodiments of the invention or technical schemes in the prior art, the following simple introductions for the figures required to be used in the embodiments or descriptions in the prior art are made. Obviously, the figures described as follows are some of the embodiments of the invention, and common technicians in the field can acquire other figures according to theses the figures on the premise of no creative labor.

DETAILED DESCRIPTION OF THE EMBODIMENTS

To make the aims, technical schemes and advantages of the embodiments of the invention more clear, the technical schemes in the embodiments of the invention are clearly and completely described as follows according to the drawings in the embodiments of the invention. It can be seen that the described embodiments are part of the embodiments of the invention rather than all of the embodiments. Based on the embodiments of the invention, all the other embodiments acquired by the common technicians in the field on the premise of no creative labor belong to the scope of protection of the invention.

Objects in a three-dimensional virtual reality scene are divided into a combined object (or called as combined element) and a single object (or called as a single element), wherein the combined object consists of a plurality of the single objects. Construction of the three-dimensional virtual reality scene takes no consideration of the combined object, and only all the single objects in the scene need to be constructed; a tree management structure may be constructed by defining subordination and combination modes of the objects in the three-dimensional virtual reality scene. All nodes in the tree management structure are divided into real nodes and virtual nodes, wherein the real node is a leaf node of the tree management structure, and the leaf node corresponds to the single object in the three-dimensional virtual reality scene; and, the virtual nodes are all the nodes except the leaf nodes, and the virtual node corresponds to the combined object in the three-dimensional virtual reality scene. The display of the combined object in the three-dimensional virtual reality scene depends on the combination mode of all the single objects constituting the combined object, and all the real nodes and the virtual nodes constitute the tree management structure according to hierarchy dividing rule.

Figure 2:
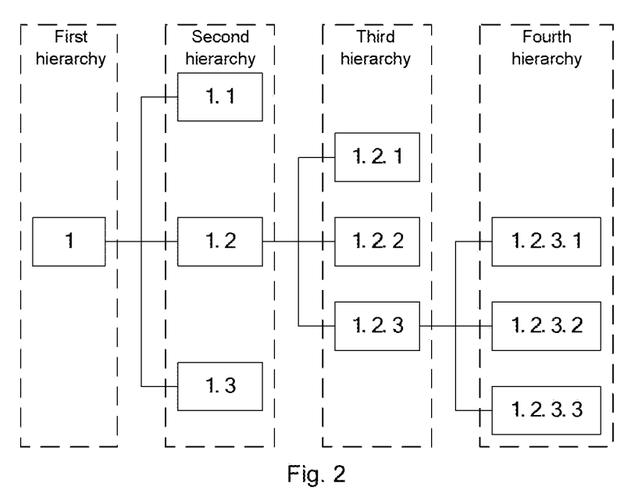
FIG. 2 is a diagram showing a three management structure of an embodiment of the invention.

Illustrations are referred to a diagram showing the tree management structure displayed in FIG. 2. The first hierarchy includes a root node 1, and the second hierarchy includes child nodes 1.1, 1.2 and 1.3; the third hierarchy includes child nodes 1.2.1, 1.2.2 and 1.2.3; the fourth hierarchy includes child nodes 1.2.3.1, 1.2.3.2 and 1.2.3.3, wherein the root node 1 and the child nodes 1.2 and 1.2.3 are virtual nodes and correspond to the combined objects in three-dimensional virtual reality scene, and other nodes are real nodes and correspond to the single objects in the three-dimensional virtual reality scene. The subordination and combination modes of the objects are defined in the three-dimensional virtual reality scene so as to construct the tree management structure of the objects in the three-dimensional virtual reality scene.

The nodes in the tree management structure consist of the leaf nodes and non-leaf nodes; the leaf node corresponds to the single object in the three-dimensional virtual reality scene, and the non-leaf node corresponds to the combined object in the three-dimensional virtual reality scene, wherein the combined object consists of a plurality of the single objects. Generation of the tree management structure according to the subordination and combination modes among all the objects in the three-dimensional virtual reality scene is implemented by steps as follows:

1: mapping a first combined object to the root node of the tree management structure, wherein the root node is a virtual node and is on the first hierarchy of the tree management structure, and the first combined object represents the whole three-dimensional virtual reality scene and is a combined object combined by all the single objects in the scene;

2: if the first combined object includes N parts, the object corresponding to each part of the first combined object belongs to the second hierarchy of the tree management structure, and the node corresponding to each part of the first combined object is a child node of the root node, wherein N is greater than or equal to 1 and is an integer;

3: when the first combined object consists of E second combined objects and F single objects, and if the second combined object includes M parts, the object corresponding to each part of each second combined object belongs to the third hierarchy of the tree management structure, and the node corresponding to each part of each second combined object is a child node of the node corresponding to the second combined object, wherein N=E+F, E is greater than or equal to 1, F is greater than or equal to 0, M is greater than or equal to 1, and E, F and M are integers;

4: decomposing different combined objects on each hierarchy by the same manner as above until all the single objects are mapped to the corresponding hierarchies in the tree management structure.

Figure 3:
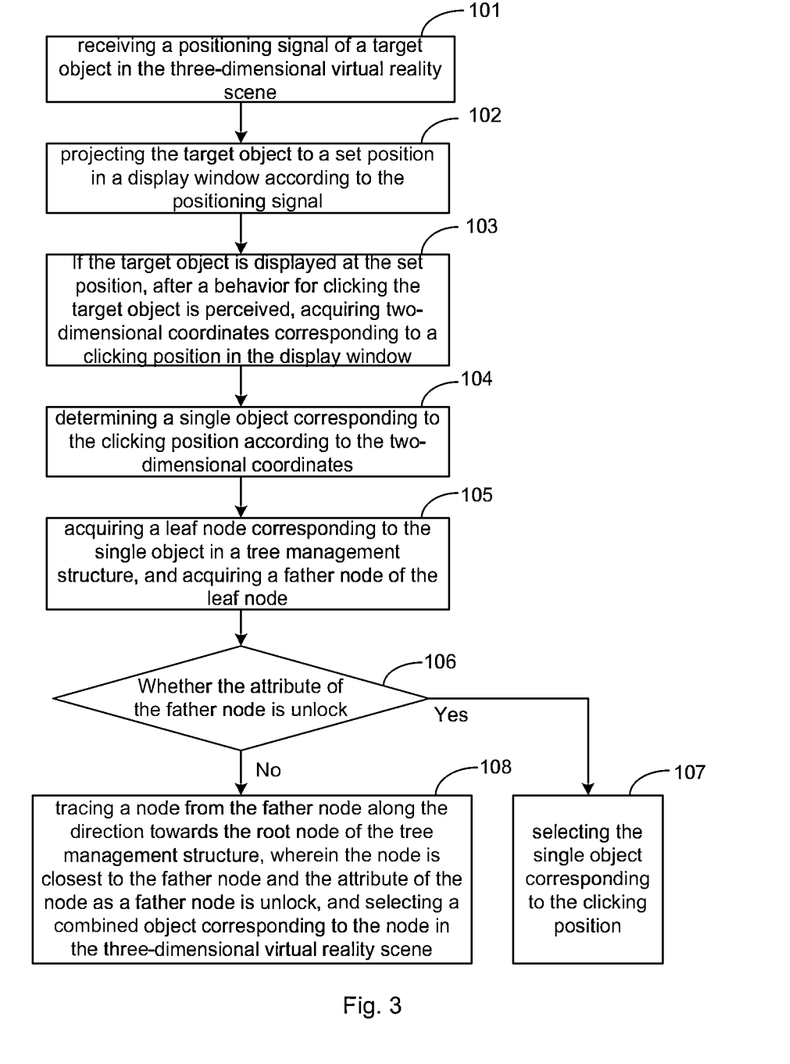
FIG. 3 is a flow diagram of an embodiment I of a method for clicking and selecting an object in a three-dimensional virtual reality scene of an embodiment of the invention.

As shown by FIG. 3, a specific embodiment I of a method for clicking and selecting an object in the three-dimensional virtual reality scene includes the following steps:

101: receiving a positioning signal of a target object in the three-dimensional virtual reality scene;

in the embodiment, the objects in the three-dimensional virtual reality scene include a single object and a combined object; the combined object consists of a plurality of the single objects; the target object may be either a single object or a combined object. Each object may be mapped to a digit or a letter on a keyboard, and different digits or different letters represent different objects; the object may be either a single object or a combined object, and the positioning signal may be input in a form of inputting the digit or the letter through the keyboard, so that a system can map the positioning signal to an object to be clicked and selected.

102: projecting the target object to a set position in a display window according to the positioning signal;

in the embodiment, the three-dimensional virtual reality scene may either consist of one or several objects or consist of many objects; when the scene is relatively large, the target object to be selected is possibly not in the current display window, so that the positioning signal is needed to find the target object and project the target object to the set position; in addition, the target object is projected to the set position of the display window through a scene camera, but the target object projected to the display window is possibly shaded by projections of other objects.

The positioning signal includes an Identity Number (ID) including information of two aspects, namely the target object and a projection position of the target object. The projection position can be any position of the display window, such as a center position of the display window. Regarding the projection position, a program can be used for automatically projecting the target object to the set position, or the target object can be projected to a position required by a user by inputting an instruction.

103: if the target object is displayed at the set position, and after a behavior for clicking the target object is perceived, acquiring two-dimensional coordinates corresponding to a clicking position in the display window;

in the embodiment, the behavior for clicking the object in the three-dimensional virtual reality scene includes but is not limited to the following three modes: first, controlling a mouse to click and select the object in the three-dimensional virtual reality scene; second, when the display window is a touch screen, clicking and selecting the object in the three-dimensional virtual reality scene through a touch pen or by a finger touch mode; third, clicking and selecting the object in the three-dimensional virtual reality scene by a mode of inputting an instruction through the keyboard.

104: determining a single object(s) corresponding to the clicking position according to the two-dimensional coordinates;

the two-dimensional coordinates corresponding to the clicking position are transmitted to a virtual camera corresponding to the window of the three-dimensional scene, and a ray perpendicular to the window of the three-dimensional scene is generated in a direction of the position of the camera, wherein the ray extends in the three-dimensional scene, and a single object which is intersected with the ray in the scene can be to detected, and the single object corresponds to a certain leaf node in the tree management structure.

105: acquiring a leaf node in a tree management structure, wherein the leaf node corresponds to the single object corresponding to the clicking position, and acquiring a father node of the leaf node;

the object in the three-dimensional scene includes a combined object and a single object; the combined object corresponds to the non-leaf node in the tree management structure, namely the virtual node; the single object corresponds to the leaf node in the tree management structure, namely the real node; the single object is real and visible; the combined object consists of a plurality of the single objects. It can be seen that above father node is a virtual node corresponding to one combined object.

106: judging whether the attribute of the father node of the leaf node is unlock, and if so, executing Step 107, otherwise, executing Step 108;

107: if the attribute of the father node of the leaf node is unlock, selecting a single object corresponding to the clicking position, wherein the single object is the target object.

108: if the attribute of the father node of the leaf node is lock, tracing a node from the father node along a direction towards the root node of the tree management structure, wherein the traced node is closest to the father node and the attribute of the traced node as a father node is unlock, and selecting a combined object corresponding to the traced node in the three-dimensional virtual reality scene, wherein the combined object is the target object.

Each virtual node in the tree management structure has a configurable attribute, namely whether to be lock. If a certain object on the current hierarchy is a combined object, the attribute of the virtual node corresponding to the object is lock; when entering the next hierarchy of the virtual node, the attribute of the virtual node is configured to be unlock; when backing to the previous hierarchy of the virtual node, the attribute of the virtual node is still lock, but the attribute of the father node of the virtual node is configured to be lock, and the father node is also a virtual node.

In the embodiment I, the target object is projected to the set position (or called as the given position) according to the positioning signal, so as to find a target object to be selected; By the pre-constructed tree management structure, it not only realizes the selection of the target object serving as a single object, but also realizes the selection of the target object serving as a combined object. The scheme can realize the click and selection of the object through an existing mouse and an existing keyboard instead of using other tools.

Figure 4:
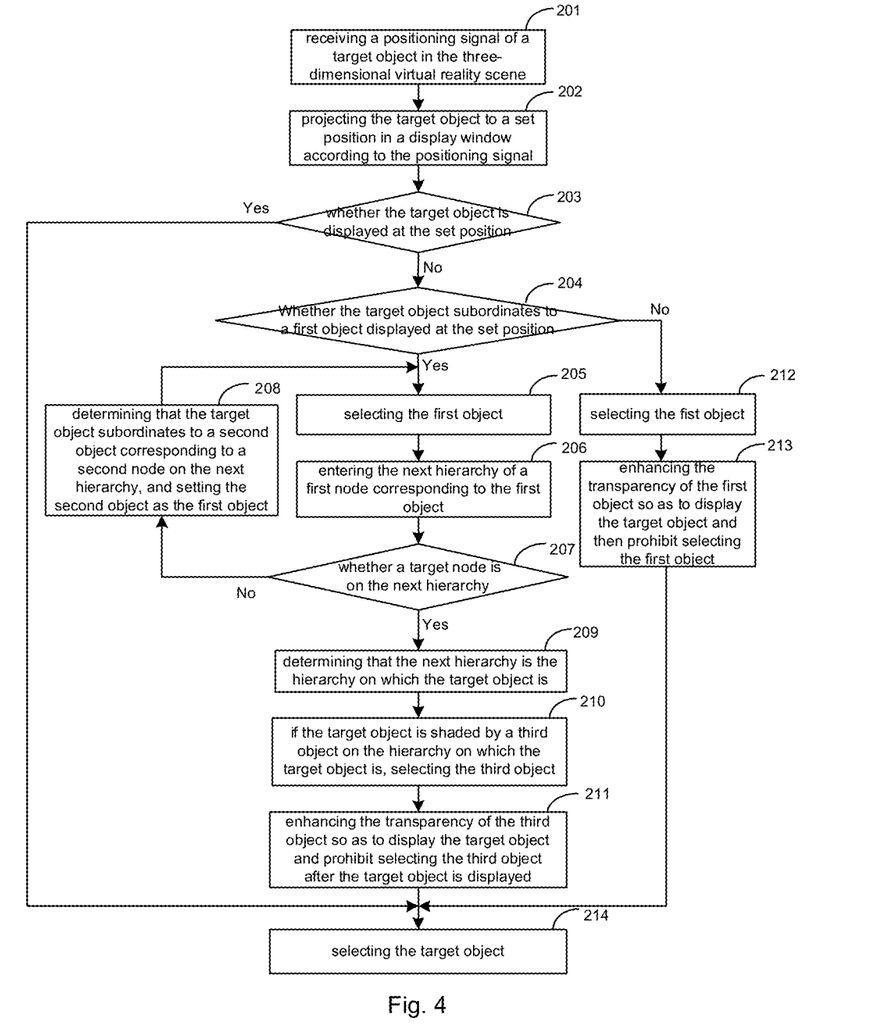
FIG. 4 is a flow diagram of an embodiment II of a method for clicking and selecting an object in a three-dimensional virtual reality scene of an embodiment of the invention.

As shown by FIG. 4, a specific embodiment II of a method for clicking and selecting an object in a three-dimensional virtual reality scene includes steps:

201: receiving a position signal of a target object in the three-dimensional virtual reality scene.

202: projecting the target object to a set position (or called as given position) on a display screen according to the positioning signal;

203: judging whether the target object is displayed at the set position, and if so, executing Step 214, otherwise, executing Step 204.

If the target object to be selected is not displayed at the set position of the current window, it is illustrated that the target object is shaded by other object(s), and the shading situation includes but is not limited to the following three situations: first, the target object is shaded behind a certain object; second, the target object is enclosed by a certain object or several objects; third, the target object is included in a certain object, and in this situation, the object is viewed to be shaded in every view angle.

204: judging whether the target object subordinates to a first object displayed at the set position in the three-dimensional virtual reality scene, and if so, executing Step 205, otherwise, executing Step 212.

205: if the target object subordinates to the first object, after a behavior for clicking the first object is perceived, acquiring two-dimensional coordinates corresponding to a clicking position in the display window, and executing the Step 104 to 108 to select the first object;

By referring to the drawing showing the structure of the tree management structure in FIG. 2, it is illustrated that if the target object is an object corresponding to the node 1.2.3 on the third hierarchy, and the first object displayed at the set position is an object corresponding to the node 1, the target object subordinates to the first object.

206: after a command for entering a next hierarchy is received, entering the next hierarchy of the first node corresponding to the first object, and configuring the attribute of the first node to be unlock;

As shown by FIG. 2, if the target object is the object corresponding to the node 1.2.3 on the third hierarchy, and after the command for entering the next hierarchy is received, at the moment, all the objects on the second hierarchy are unfolded in the three-dimensional virtual reality scene, namely the objects corresponding to the nodes 1.1, 1.2 and 1.3 in the three-dimensional virtual reality scene are unfolded, and the attribute of the node 1 is configured to be unlock.

207: judging whether the target node corresponding to the target object in the tree management structure is positioned on the next hierarchy, if so, executing Step 209, otherwise, executing Step 208;

208: determining that the target object subordinates to a second object corresponding to a second node on the next hierarchy, setting the second object to be the first object, and executing the Step 205;

As shown by FIG. 2, since the target object corresponding to the target node 1.2.3 subordinates to the object corresponding to the node 1, and the target node 1.2.3 is not on the second hierarchy after entering the second hierarchy, the target object corresponding to the target node 1.2.3 also subordinates to the object corresponding to the node 1.2, namely the node 1.2 is the second node, and the object corresponding to the node 1.2 is the second object. When the object corresponding to the node 1.2 is clicked, and a command for entering the next hierarchy is received again, the next hierarchy of the second hierarchy, namely the third hierarchy, is entered, and the third hierarchy is the hierarchy where the node 1.2.3 corresponding to the target object is positioned.

209: determining that the next hierarchy is the hierarchy where the target object is positioned;

210: if the target object is shaded by a third object on the hierarchy where the target object is positioned, after a behavior for clicking the third object is perceived, acquiring two-dimensional coordinates corresponding to a clicking position in the display window, and executing the Step 104 to 108 to select the third object;

211: enhancing the transparency of the third object so as to display the target object and then prohibit selecting the third object after the target object is displayed, and executing Step 214;

In the embodiment, after the third object shading the target object is selected, it is necessary to perform transparency configuration on the third object, so as to display the target object shaded and subsequently select the target object; after the transparency configuration is performed on the third object, the third object is possibly viewed and possibly invisible completely, but the third object is still real, so that it is necessary to perform non-selection configuration on the third object to prohibit selecting the third object, and then the target object can be clicked and selected.

The transparency configuration is to change materials of the object in the three-dimensional virtual reality scene. As the objects in the three-dimensional scene are all models, and the effect of displaying the models may be embodied through the materials; a main effect is to display the target object. For example: a wall is configured to be transparent, so that the objects behind the wall can be viewed. The scope of the transparency configuration may be 50% to 100%. In addition, the non-selection configuration is to make a three-dimensional scene object not be selected, which means in the three-dimensional scene that the ray detection is not performed for the object.

Figure 5:
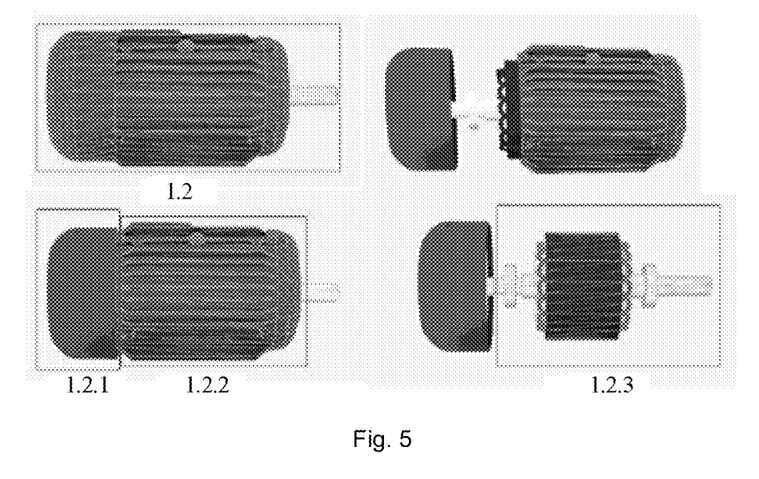
FIG. 5 is a diagram of a corresponding relation between nodes and objects in a scene of an embodiment of the invention.

As showed in FIG. 2, the target object corresponding to the node 1.2.3 is possibly shaded by the second object corresponding to the node 1.2.1 or the node 1.2.2. For example, by referring to a corresponding relation map between the node and the scene object in FIG. 5, the combined object corresponding to the node 1.2 in the tree management structure consists of three objects corresponding to the nodes 1.2.1, 1.2.2 and 1.2.3; the object corresponding to the node 1.2.3 is supposed to be the target object to be clicked and selected, and then the target object is shaded by the object corresponding to the node 1.2.2 on the same hierarchy; when the transparency configuration and the non-selection configuration are performed for the object corresponding to the node 1.2.2, the target object is displayed.

212: if the target object does not subordinate to the first object, then after a behavior for clicking the first object is perceived, acquiring two-dimensional coordinates corresponding to the clicking position in the display window, and executing the Steps 104 to 108 to select the first object;

213: enhancing the transparency of the first object so as to display the target object and prohibit selecting the first object after the target object is displayed;

214: after the behavior for clicking the target object is perceived, acquiring the two-dimensional coordinates corresponding to the clicking position in the display window, and executing the Steps 104 to 108 to select the target object.

In the embodiment II, by adopting the tree management structure generated by the subordination and combination modes of the objects in the three-dimensional virtual reality scene, it not only realizes the selection of the combined object and the single object of the objects in the three-dimensional virtual reality scene, but also realizes the click and selection of the target object shaded.

Figure 6:
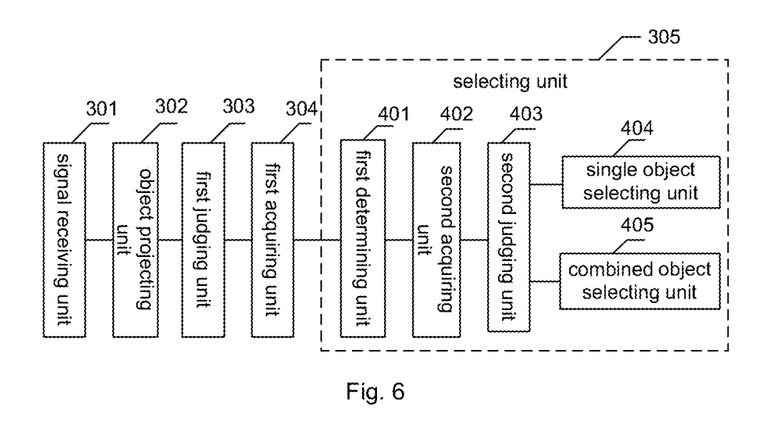
FIG. 6 is a structure diagram of an embodiment I of a device for clicking and selecting an object in a three-dimensional virtual reality scene of an embodiment of the invention.

FIG. 6 is a structure diagram of an embodiment I of a device for clicking and selecting an object in a three-dimensional virtual reality scene. The device includes: a signal receiving unit 301, configured to receive a positioning signal of a target object in the three-dimensional virtual reality scene; an object projecting unit 302, configured to project the target object to a set position (or called as given position) in a display window according to the positioning signal; a first judging unit 303, configured to judge whether the target object is displayed at the set position; a first acquiring unit 304, configured to, when the first judging unit judges that the target object is displayed at the set position, acquire two-dimensional coordinates corresponding to a clicking position in the display window after a behavior for clicking the target object is perceived; a selecting unit 305, configured to select the target object. The selecting unit includes: a first determining unit 401, configured to determine a single object corresponding to the clicking position according to the two-dimensional coordinates corresponding to the clicking position; a second acquiring unit 402, configured to acquire a leaf node corresponding to the single object in a tree management structure, and acquire a father node of the leaf node; a second judging unit 403, configured to judge whether the attribute of the father node is unlock; a single object selecting unit 404, configured to select the single object if the second judging unit judges that the attribute of the father node is unlock; a combined object selecting unit 405, configured to trace a node from the father node along a direction towards to the root node of the tree management structure when the second judging unit judges that the attribute of the father node is lock, wherein the traced node is closest to the father node and the attribute of the traced node as a father node is unlock, and selecting a combined object corresponding to the traced node in the three-dimensional virtual reality scene.

Figure 7:
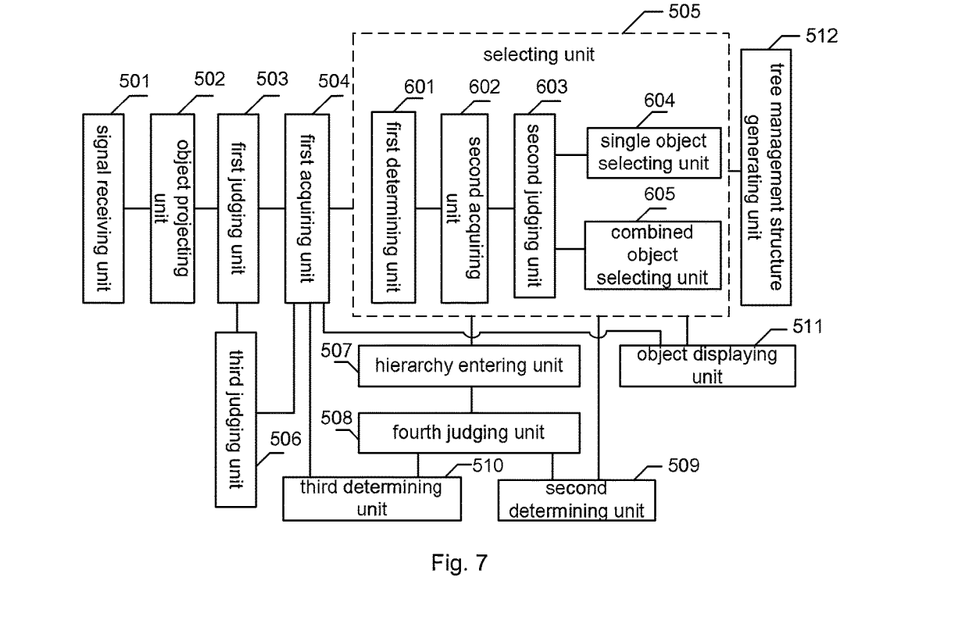
FIG. 7 is a structure diagram of an embodiment II of a device for clicking and selecting an object in a three-dimensional virtual reality scene of an embodiment of the invention.

FIG. 7 is a structure diagram of an embodiment II of a device for clicking and selecting an object in a three-dimensional virtual reality scene. The device includes: a signal receiving unit 501, configured to receive a positioning signal of a target object in the three-dimensional virtual reality scene; an object projecting unit 502, configured to project the target object to a set position in a display window according to the positioning signal; a first judging unit 503, configured to judge whether the target object is displayed at the set position; a first acquiring unit 504, configured to, when the first judging unit judges that the target object is displayed at the set position, acquire two-dimensional coordinates corresponding to a clicking position in the display window after a behavior for clicking the target object is perceived; a selecting unit 505, configured to select the target object; a third judging unit 506, configured to judge whether the target object subordinates to a first object displayed at the set position in the three-dimensional virtual reality scene when the first judging unit judges that the target object is not displayed at the set position; the first acquiring unit 504 is further configured to, when the third judging unit judges that the target object subordinates to the first object, acquire two-dimensional coordinates corresponding to a clicking position in the display window after a behavior for clicking the first object is perceived; the selecting unit 505 is further configured to select the first object; a hierarchy entering unit 507, configured to, after the selecting unit clicks the first object, enter a next hierarchy of a first node corresponding to the first object when a command for entering the next hierarchy is received, and configure the attribute of the first node to be unlock; a fourth judging unit 508, configured to judge whether a target node corresponding to the target object in the tree management structure is on the next hierarchy; a second determining unit 509, configured to determine that the target object subordinates to a second object corresponding to a second node on the next hierarchy when the fourth judging unit judges that the target node corresponding to the target object in the tree management structure is not on the next hierarchy, and set the second object to be the first object; a third determining unit 510, configured to determine that the next hierarchy is a hierarchy where the target object is positioned when the fourth judging unit judges that the target node corresponding to the target object in the tree management structure is positioned on the next hierarchy; the first acquiring unit 504 is further configured to, when the target object is shaded by a third object on the hierarchy where the target object is positioned, acquire two-dimensional coordinates corresponding to a clicking position in the display window after a behavior for clicking the third object is perceived; the selecting unit 505 is also configured to select the third object; an object displaying unit 511, configured to, when the selecting unit clicks the third object, enhance the transparency of the third object so as to display the target object and prohibit selecting the third object after the target object is displayed; the first acquiring unit 504 is also configured to, when the selection of the third object is prohibited, acquire two-dimensional coordinates corresponding to a clicking position in the display window after a behavior for clicking the target behavior is perceived; the selecting unit 505 is also configured to select the target object. The first acquiring unit 504 is also configured to, when the target object does not subordinate to the first object, acquire the two-dimensional coordinates corresponding to a clicking position in the display window after a behavior for clicking the first object is perceived; the selecting unit 505 is also configured to select the first object; the object displaying unit is also configured to enhance the transparency of the first object so as to display the target object and prohibit selecting the first object after the target object is displayed; the first acquiring unit 511 is also configured to acquire the two-dimensional coordinates corresponding to a clicking position in the display window after a behavior for clicking the target object is perceived; the selecting unit 505 is configured to select the target object.

In the above, the selecting unit includes: a first determining unit 601, configured to determine a single object corresponding to the clicking position according to the two-dimensional coordinates; a second acquiring unit 602, configured to acquire a leaf node corresponding to the single object in the tree management structure, and acquire a father node of the leaf node; a second judging unit 603, configured to judge whether the attribute of the father node is unlock; a single object selecting unit 604, configured to select the single object when the second judging unit judges that the attribute of the father node is unlock; a combined object selecting unit 605, configured to trace a node from the father node along a direction towards to the root node of the tree management structure when the second judging unit judges that the attribute of the father node is lock, wherein the traced node is closest to the father node and the attribute of the traced node as a father node is unlock, and select a combined object corresponding to the traced node in the three-dimensional virtual reality scene.

The device further includes: a tree management structure generating unit 512, configured to generate the tree management structure according to subordination and combination modes among all the objects in the three-dimensional virtual reality scene, wherein the nodes in the tree management structure consist of the leaf nodes and non-leaf nodes; the leaf node corresponds to the single object in the three-dimensional virtual reality scene, and the non-leaf node corresponds to combined object in the virtual reality scene; the combined object consists of a plurality of the single objects.

It should be noted that in the text, relation terms such as "first" and "second" are only used for distinguishing one entity or operation from another entity or operation rather than requiring or implying that such any actual relations or sequences between these entities or operations. In addition, the terms 'include', 'contain' or any other variants meaning to cover non-exclusive inclusions, so that a process, a method, an object or equipment which includes a series of factors not only includes these factors, but also includes other factors which are not specifically listed, or includes factors which are fixed to the process, the method, the object or the equipment. Under a condition of no more limitations, the factor limited by a sentence 'including a . . . ' is not excluded that other identical factors still exist in the process, the method, the object or the equipment including the factors.

The above are only the preferred embodiments of the invention, and are not intended to limit the scope of protection of the invention. Any modifications, equivalent replacements, improvements and the like which are performed within the spirit and the principle of the invention are included in the scope of protection of the invention.

The invention claimed is:

1. A method for clicking and selecting an object in a three-dimensional virtual reality scene, comprising:
   A1: receiving a positioning signal of a target object in a three-dimensional virtual reality scene;
   A2: projecting the target object to a set position in a display window according to the positioning signal;
   A3: if the target object is displayed at the set position, after a behavior for clicking the target object is perceived, acquiring two-dimensional coordinates corresponding to a clicking position in the display window;
   A4: determining a single object corresponding to the clicking position according to the two-dimensional coordinates;
   A5: acquiring a leaf node corresponding to the single object in a tree management structure, and acquiring a father node of the leaf node;
   A6: if the attribute of the father node is unlock, selecting the single object;
   A7: if the attribute of the father node is lock, tracing a node from the father node along a direction towards a root node of the tree management structure, wherein the node is closest to the father node and the attribute of the node as a father node is unlock, and selecting a combined object corresponding to the node in the three-dimensional virtual reality scene;
   the method further comprises:
   B1: if the target object is not displayed at the set position, judging whether the target object subordinates to a first object displayed at the set position in the three-dimensional virtual reality scene;
   B2: if the target object subordinates to the first object, after a behavior for clicking the first object is perceived, acquiring two-dimensional coordinates corresponding to a clicking position in the display window;
   B3: executing the Steps A4 to A7 so as to select the first object;
   B4: after a command for entering a next hierarchy is received, entering the next hierarchy of a first node corresponding to the first object, and configuring the attribute of the first node to be unlock;
   B5: judging whether a target node corresponding to the target object in the tree management structure is on the next hierarchy, if so, executing Step B7, otherwise, executing Step B6;
   B6: determining that the target object subordinates to a second object corresponding to a second node on the next hierarchy, setting the second object to be the first object, and executing the Step B2;
   B7: determining that the next hierarchy is a hierarchy where the target object is positioned;
   B8: if the target object is shaded by a third object on the hierarchy where the target object is positioned, after a behavior for clicking the third object is perceived, acquiring two-dimensional coordinates corresponding to a clicking position in the display window;
   B9: executing the Steps A4 to A7 so as to select the third object;
   B10: enhancing the transparency of the third object so as to display the target object and prohibit selecting the third object after the target object is displayed;
   B11: after a behavior for clicking the target object is perceived, acquiring two-dimensional coordinates corresponding to a clicking position in the display window;
   B12: executing the Steps A4 to A7 so as to select the target object;
   wherein a virtual node in the tree management structure has a configurable attribute, the configurable attribute is used for indicating whether to be lock, the virtual node is corresponding to the combined object;
   when an object on the current hierarchy is a combined object, a attribute of the virtual node corresponding to the object is lock; when entering the next hierarchy of the virtual node, the attribute of the virtual node is configured to be unlock; when backing to the previous hierarchy of the virtual node, the attribute of the virtual node is still lock, but the attribute of the father node of the virtual node is configured to be lock, and the father node is also a virtual node;

wherein the two-dimensional coordinates corresponding to the clicking position are transmitted to a virtual camera corresponding to the window of the three-dimensional scene, and a ray perpendicular to the window of the three-dimensional scene is generated in a direction of the position of the camera, wherein the ray extends in the three-dimensional scene, and a single object which is intersected with the ray in the scene can be to detected.

2. The method according to claim 1, further comprising:

C1: if the target object does not subordinate to the first object, after a behavior for clicking the first object is perceived, acquiring two-dimensional coordinates corresponding to a clicking position in the display window;

C2: executing the Steps A4 to A7 so as to select the first object;

C3: enhancing the transparency of the first object so as to display the target object and prohibit selecting the first object after the target object is displayed;

C4: after a behavior for clicking the target object is perceived, acquiring two-dimensional coordinates corresponding to a clicking position in the display window;

C5: executing the Steps A4 to A7 so as to select the target object.

3. The method according to claim 1, further comprising:

if the clicking position does not correspond to a single object, sending a clicking and selecting failure message.

4. The method according to claim 3, further comprising:

generating the tree management structure according to subordination and combination modes among all the objects in the three-dimensional virtual reality scene, wherein nodes in the tree management structure consist of leaf nodes and non-leaf nodes; the leaf nodes correspond to single objects in the three-dimensional virtual reality scene, and the non-leaf nodes correspond to combined objects in the three-dimensional virtual reality scene; each of the combined objects consists of a plurality of single objects.

5. The method according to claim 4, wherein the step of generating the tree management structure according to the subordination and combination modes among all the objects in the three-dimensional virtual reality scene comprises:

mapping a first combined object to a root node of the tree management structure, wherein the root node is on the first hierarchy of the tree management structure, and the first combined object is the whole three-dimensional virtual reality scene;

if the first combined object includes N parts, the object corresponding to each part of the first combined object belongs to the second hierarchy of the tree management structure, and the node corresponding to each part of the first combined object is a child node of the root node, wherein N is greater than or equal to 1 and is an integer;

when the first combined object consists of E second combined objects and F single objects, and if the second combined object include M parts, the object corresponding to each part of each second combined object belongs to the third hierarchy of the tree management structure, and the node corresponding to each part of each second combined object is a child node of the node corresponding to the each second combined object, wherein N=E+F, E is greater than or equal to 1, F is greater than or equal to 0, M is greater than or equal to 1, and E, F and M are integers;

performing steps by the same manner as above until all the single objects are mapped to corresponding hierarchies in the tree management structure.

6. A device for clicking and selecting an object in a three-dimensional virtual reality scene, comprising:

a signal receiving unit, configured to receive a positioning signal of a target object in the three-dimensional virtual reality scene;

an object projecting unit, configured to project the target object to a set position in a display window according to the positioning signal;

a first judging unit, configured to judge whether the target object is displayed at the set position;

a first acquiring unit, configured to, when the first judging unit judges that the target object is displayed at the set position, acquire two-dimensional coordinates corresponding to a clicking position in the display window after a behavior for clicking the target object is perceived;

a selecting unit, configured to select the target object wherein the selecting unit comprises:

a first determining unit, configured to determine a single object corresponding to the clicking position according to the two-dimensional coordinates;

a second acquiring unit, configured to acquire a leaf node corresponding to the single object in a tree management structure, and acquire a father node of the leaf node;

a second judging unit, configured to judge whether the attribute of the father node is unlock;

a single object selecting unit, configured to select the single object when the second judging unit judges that the attribute of the father node is unlock;

a combined object selecting unit, configured to trace a node from the father node along a direction towards the root node of the tree management structure when the second judging unit judges that the attribute of the father node is lock, wherein the node is closest to the father node and the attribute of the node as a father node is unlock, and select a combined object corresponding to the node in the three-dimensional virtual reality scene;

a third judging unit, configured to judge whether the target object subordinates to a first object displayed at the set position in the three-dimensional virtual reality scene when the first judging unit judges that the target object is not displayed at the set position;

wherein the first acquiring unit is further configured to, when the third judging unit judges that the target object subordinates to the first object, acquire two-dimensional coordinates corresponding to a clicking position in the display window after a behavior for clicking the first object is perceived;

wherein the selecting unit is further configured to select the first object;

a hierarchy entering unit, configured to, after the selecting unit selects the first object, enter a next hierarchy of a first node corresponding to the first object when a command for entering the next hierarchy is received, and configure the attribute of the first node to be unlock;

a fourth judging unit, configured to judge whether a target node corresponding to the target object in the tree management structure is on the next hierarchy;

a second determining unit, configured to determine that the target object subordinates to a second object corresponding to a second node on the next hierarchy when the fourth judging unit judges that the target node corresponding to the target object in the tree management structure is not on the next hierarchy, and set the second object to be the first object;

a third determining unit, configured to determine that the next hierarchy is a hierarchy where the target object is positioned when the fourth judging unit judges that the target node corresponding to the target object in the tree management structure is on the next hierarchy;

wherein the first acquiring unit is further configured to, when the target object is shaded by a third object on the hierarchy where the target object is positioned, acquire two-dimensional coordinates corresponding to a clicking position in the display window after a behavior for clicking the third object is perceived;

wherein the selecting unit is further configured to select the third object;

an object displaying unit, configured to enhance the transparency of the third object after the selecting unit selects the third object so as to display the target object and prohibit selecting the third object after the target object is displayed;

wherein the first acquiring unit is further configured to acquire two-dimensional coordinates corresponding to a clicking position in the display window after a behavior for clicking the target behavior is perceived;

wherein the selecting unit is further configured to select the target object;

wherein a virtual node in the tree management structure has a configurable attribute, the configurable attribute is used for indicating whether to be lock, the virtual node is corresponding to the combined object;

when an object on the current hierarchy is a combined object, a attribute of the virtual node corresponding to the object is lock; when entering the next hierarchy of the virtual node, the attribute of the virtual node is configured to be unlock; when backing to the previous hierarchy of the virtual node, the attribute of the virtual node is still lock, but the attribute of the father node of the virtual node is configured to be lock, and the father node is also a virtual node;

wherein the two-dimensional coordinates corresponding to the clicking position are transmitted to a virtual camera corresponding to the window of the three-dimensional scene, and a ray perpendicular to the window of the three-dimensional scene is generated in a direction of the position of the camera, wherein the ray extends in the three-dimensional scene, and a single object which is intersected with the ray in the scene can be to detected.

7. The device according to claim 6, wherein
the first acquiring unit is further configured to, when the target object does not subordinate to the first object, acquire two-dimensional coordinates corresponding to a clicking position in the display window after a behavior for clicking the first object is perceived;

the selecting unit is further configured to select the first object;

the object displaying unit is further configured to enhance the transparency of the first object so as to display the target object and prohibit selecting the first object after the target object is displayed;

the first acquiring unit is further configured to acquire two-dimensional coordinates corresponding to a clicking position in the display window after a behavior for clicking the target object is perceived;

the selecting unit is further configured to select the target object.

8. The device according to claim 7, further comprising:
a tree management structure generating unit, configured to generate the tree management structure according to subordination and combination modes among all the objects in the three-dimensional virtual reality scene, wherein nodes in the tree management structure consist of leaf nodes and non-leaf nodes; the leaf nodes correspond to the single objects in the three-dimensional virtual reality scene, and the non-leaf nodes correspond to combined objects in the three-dimensional virtual reality scene; each of the combined objects consist of a plurality of single objects.

9. The method according to claim 1, further comprising:
if the clicking position does not correspond to a single object, sending a clicking and selecting failure message.

10. The method according to claim 9, further comprising:
generating the tree management structure according to subordination and combination modes among all the objects in the three-dimensional virtual reality scene, wherein nodes in the tree management structure consist of leaf nodes and non-leaf nodes; the leaf nodes correspond to single objects in the three-dimensional virtual reality scene, and the non-leaf nodes correspond to combined objects in the three-dimensional virtual reality scene; each of the combined objects consists of a plurality of single objects.

11. The method according to claim 10, wherein the step of generating the tree management structure according to the subordination and combination modes among all the objects in the three-dimensional virtual reality scene comprises:
mapping a first combined object to a root node of the tree management structure, wherein the root node is on the first hierarchy of the tree management structure, and the first combined object is the whole three-dimensional virtual reality scene;

if the first combined object includes N parts, the object corresponding to each part of the first combined object belongs to the second hierarchy of the tree management structure, and the node corresponding to each part of the first combined object is a child node of the root node, wherein N is greater than or equal to 1 and is an integer;

when the first combined object consists of E second combined objects and F single objects, and if the second combined object include M parts, the object corresponding to each part of each second combined object belongs to the third hierarchy of the tree management structure, and the node corresponding to each part of each second combined object is a child node of the node corresponding to the each second combined object, wherein N=E+F, E is greater than or equal to 1, F is greater than or equal to 0, M is greater than or equal to 1, and E, F and M are integers;

performing steps by the same manner as above until all the single objects are mapped to corresponding hierarchies in the tree management structure.

12. The method according to claim 2, further comprising:
if the clicking position does not correspond to a single object, sending a clicking and selecting failure message.

13. The method according to claim 12, further comprising:
generating the tree management structure according to subordination and combination modes among all the objects in the three-dimensional virtual reality scene, wherein nodes in the tree management structure consist of leaf nodes and non-leaf nodes; the leaf nodes correspond to single objects in the three-dimensional virtual reality scene, and the non-leaf nodes correspond to combined objects in the three-dimensional virtual reality scene; each of the combined objects consists of a plurality of single objects.

14. The method according to claim 13, wherein the step of generating the tree management structure according to the subordination and combination modes among all the objects in the three-dimensional virtual reality scene comprises:
mapping a first combined object to a root node of the tree management structure, wherein the root node is on the first hierarchy of the tree management structure, and the first combined object is the whole three-dimensional virtual reality scene;

if the first combined object includes N parts, the object corresponding to each part of the first combined object belongs to the second hierarchy of the tree management structure, and the node corresponding to each part of the first combined object is a child node of the root node, wherein N is greater than or equal to 1 and is an integer;

when the first combined object consists of E second combined objects and F single objects, and if the second combined object include M parts, the object corresponding to each part of each second combined object belongs to the third hierarchy of the tree management structure, and the node corresponding to each part of each second combined object is a child node of the node corresponding to the each second combined object, wherein N=E+F, E is greater than or equal to 1, F is greater than or equal to 0, M is greater than or equal to 1, and E, F and M are integers;

performing steps by the same manner as above until all the single objects are mapped to corresponding hierarchies in the tree management structure.

* * * * *